Figure 1:
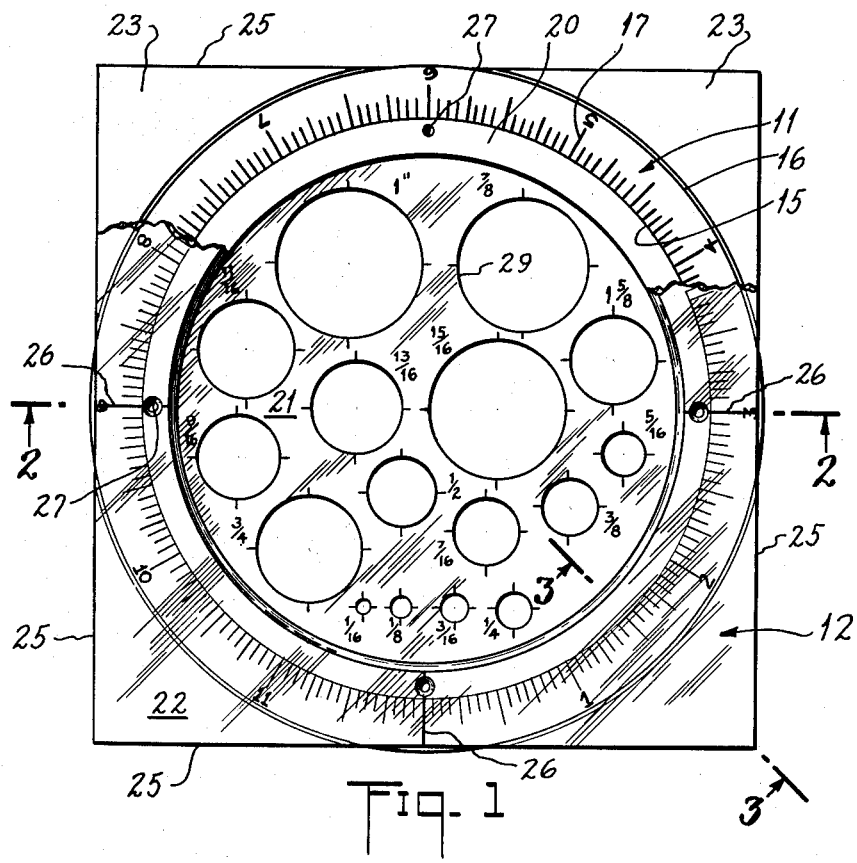

June 12, 1956  E. M. TODD  2,749,619
AUTOMATIC DRAFTING SCALE
Filed March 6, 1953

INVENTOR.
EUGENE M. TODD
BY
ATTORNEYS

United States Patent Office 2,749,619
Patented June 12, 1956

2,749,619

AUTOMATIC DRAFTING SCALE

Eugene M. Todd, Buckingham Township, Bucks County, Pa.

Application March 6, 1953, Serial No. 340,940

3 Claims. (Cl. 33—141.5)

(Granted under Title 35, U. S. Code (1952), sec. 266)

The invention described herein may be manufactured and used by or for the Government of the United States of America for governmental purposes without the payment of any royalties thereon or therefor.

This invention pertains to the art of drafting, and it comprises an instrument by means of which a draftsman drawing a line is enabled to measure the length of the line while he draws it.

The instrument of the invention comprises a measuring ring, which is flat, and comprising inner and outer peripheries that are concentric. A circumferential scale is on one of the flat surfaces of the ring between the inner and outer periphery. The scale is divided with radial lines into increment measurements of any desired linear standard of measurement, which is measured along the outer periphery of the ring.

The measuring ring is contained in a frame that comprises a band that forms a bearing on which the measuring ring rotates. A lower and an upper panel are secured to the bearing ring opposite each other, and are held spaced apart to constitute a rigid container in which the measuring ring is housed to rotate freely.

The panels are formed to comprise a straight edge, which intersects the circle of the outer periphery of the measuring ring, and is located at a tangent to the circle, the intersection preferably being closely adjacent to the tangent so that a small arc only of the outer periphery of the measuring ring projects beyond the straight edge. Thus, when the straight edge of the instrument travels along a guiding edge of a T-square or the like instrument embodying a straight edge, the outer periphery of the measuring instrument bears against the guiding edge in traction engagement therewith, and the ring is rotated thereby on the bearing band of the frame.

The frame comprises a lining guide to receive the point of a pencil or the like instrument for drawing a line. With a pencil point positioned in the lining guide, and with the straight edge of the instrument bearing against the guiding edge of a T-square, a line is drawn that is parallel with the straight edge of the T-square.

The frame also comprises an indicator, which is located on a radius of the ring, and is positioned to register with the scale. A draftsman operating the instrument is able to observe the scale travel past the indicator. This is accomplished in the disclosed embodiment by the upper panel, which embodies the indicator, being made of transparent material.

As a draftsman operating the instrument draws a line, he is able to observe the beginning and end of the line on the scale of the measuring ring. Also, he observes the distance that the scale travels while he draws the line, and thereby observes the distance that the pencil travels. The draftsman measures while he draws, and he draws the line to the length that he desires it to be. The draftsman is not required to measure off and mark the desired length preparatory to and before drawing the line.

Figure 2:
Figure 3:
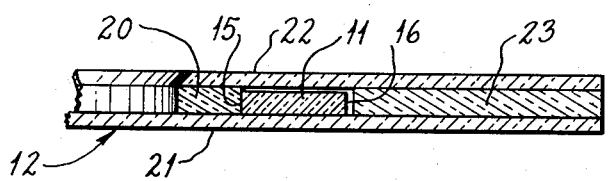

For a fuller understanding of the principles of the invention and for a disclosure of one practical embodiment thereof, attention is directed to the accompanying drawing in which Fig. 1 is a face view of an instrument embodying the invention, partially broken away for clearness of illustration, Fig. 2 is a cross-sectional elevation, taken on line 2—2 of Fig. 1, and Fig. 3 is an enlarged fragmentary cross-sectional elevation, taken on line 3—3 of Fig. 1.

The instrument of the disclosed embodiment comprises the flat circular ring 11, and the frame 12 which contains and houses the ring.

The ring 11 is flat, and comprises concentric inner and outer peripheries, 15 and 16 respectively. A linear scale 17 extends circumferentially on a flat surface of ring 11, and is disposed between the inner and outer peripheries 15 and 16 thereof, the scale preferably extending continuously throughout the circle of the ring. The indicia lines of scale 17 are directed radially as shown. Scale 17 may be any suitable or desired linear standard and is measured along the outer periphery 16. In the disclosed structure, the scale is in inches and fractions of inches, measured to scale along the circle of periphery 16.

The frame 12 contains the measuring ring 11, and comprises the bearing band 20 on which the measuring ring rotates on its inner periphery 15. Lower and upper panels, 21 and 22, respectively, are secured to the band 20 opposite each other, as shown, to enclose the measuring ring 11 between the panels. One or more spacer members 23 hold the panels 21 and 22 apart against being pressed towards each other and against the measuring ring 11, which thereby rotates freely in frame 12. In the disclosed structure of frame 12 being square, spacer members 23 are at the corners and outside the outer periphery 16 of scale 17.

The panels 21 and 22, the ring 11, the bearing band 20, and the spacer members 23, are made of any suitable transparent plastic, and in any event preferably the top panel 22 at least is transparent to enable the scale 17 of measuring ring 11 to be viewed and read. Panels 21 and 22, bearing band 20, and spacer members 23 are adhered or otherwise secured to each other to constitute a rigid housing in which the measuring ring 11 is contained.

One edge 25 at least of the frame 12 comprises a straight edge which is located at a tangent of the circle of the outer periphery 16 of measuring ring 11 and intersecting the circle. The intersection of the straight edge 25 with outer periphery 16 preferably is closely adjacent the point of tangency to cut a slight arc only of the circle of outer periphery 16. Thus, the measuring ring 11 projects slightly beyond the straight edge 25 as shown, and presses into traction engagement with a guiding surface of a T-square or the like straight edge, causing the measuring ring 11 to rotate inside the frame 12 when straight edge 25 travels along a T-square straight edge.

An indicator 26, in the form of a hair line, is scribed in the upper panel 22 and is on a radius of the measuring ring 11, positioned to register with the scale 17, the indicator 26 preferably being positioned on the radius that is perpendicular to the straight edge 25.

A bore 27 extends through the thickness of the bearing band 20 and lower and upper panels 21 and 22, and serves as a lining guide for a pencil inserted into it. In the disclosed structure, the lining guide 27 is positioned to be intersected by the radial hairline of indicator 26.

A draftsman operating an instrument embodying the present invention inserts the point of a pencil in the lining guide 27 and draws a line with the straight edge 25 traveling along the guiding edge of a suitable straight-edge instrument, such as a T-square. The outer periphery 16 of measuring ring 11 bears against the guiding edge of the T-square, and the measuring ring is rotated thereby. The draftsman observes the position on scale 17 where the pencil begins the line, and he measures the length of the line while it is being drawn, stopping the pencil at the point on scale 17 that indicates the desired length of the line. In the specific scale of the disclosure, the reading is direct in inches and fractions of inches along the scale 17.

In the preferred structure shown, the frame 12 is formed square and coaxial with the measuring ring 11. Each side 25 of the square is a straight edge at a tangent of the outer periphery of measuring ring 11. A lining guide 27 and a companion indicator 26 is associated with the straight edge 25 of each side of the square. The four sides of the instrument are the same, the several straight edges 25, indicators 26 and lining guides 27 being alike. Incident to the geometric nature of frame 12 being square and coaxial with the measuring ring 11, each set of a straight edge 25, lining guide 27, and indicator 26 companion to each other is located at the mid-point along its corresponding side. The several lining guides 27 are available alternatively in accordance with whichever of the straight edges 25 is placed against the T-square.

In the specific structure of the disclosed embodiment, the upper panel 22 is extended to cover the area from the several sides 25 of the square towards and to the inner periphery of bearing band 20.

The lower panel 21 is extended to cover the entire area of the square. The area of lower panel 21 within the circle of bearing band 20 may be utilized in any of a number of ways that are useful to a drafts. For example, the circle of panel 21 within bearing band 20 may contain cut-out holes 29 for stencils, and in the structure of the disclosed embodiment a circular stencil hole 29 is provided in each diameter from $\frac{1}{16}''$ to $1'$, in increments of $\frac{1}{16}''$.

The disclosed structure is one practical embodiment of the invention.

I claim:

1. In a drafting instrument, a flat circular ring and a frame containing the ring, the ring comprising concentric inner and outer peripheries and a linear scale arranged circumferentially between the peripheries, the frame comprising a bearing for rotating the ring on one of its peripheries, a lining guide comprising a bore projecting through the thickness of the instrument for a line-drawing implement to project through and carry the instrument along while a line is being drawn, an indicator and a straight edge intersecting the outer periphery of the ring at a tangent thereof, the scale being calibrated to indicate length according to the outer periphery of the ring, and the indicator being positioned on a radius of the ring and in registry with the scale.

2. In a drafting instrument as defined in claim 1, the indicator intersecting the lining guide and being on the radius perpendicular to the straight edge.

3. In a drafting instrument as defined in claim 1, the frame constituting a square coaxial with the measuring ring, each side of the square constituting a straight edge at a tangent of the outer periphery of the ring, a lining guide and companion indicator associated with the straight edge of each side of the square, and being disposed midway of the length thereof.

References Cited in the file of this patent
UNITED STATES PATENTS

| 1,383,759 | Romie | July 5, 1921 |
| 1,398,323 | Freyder | Nov. 29, 1921 |
| 1,494,055 | Benko | May 13, 1924 |
| 1,805,740 | Peters | May 19, 1931 |
| 2,357,131 | Putnam | Aug. 29, 1944 |
| 2,493,912 | Brown | Jan. 10, 1950 |
| 2,495,974 | Kelley | Jan. 31, 1950 |